United States Patent
Lo et al.

(10) Patent No.: US 10,061,651 B2
(45) Date of Patent: Aug. 28, 2018

(54) SYSTEM AND METHOD FOR HOSTING MULTIPLE RECOVERY OPERATING SYSTEMS IN MEMORY

(71) Applicant: Dell Products, LP, Round Rock, TX (US)

(72) Inventors: Yuan-Chang Lo, Austin, TX (US); Todd E. Swierk, Austin, TX (US); Carlton A. Andrews, Austin, TX (US); Anantha Boyapalle, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 304 days.

(21) Appl. No.: 14/738,430

(22) Filed: Jun. 12, 2015

(65) Prior Publication Data
US 2016/0364297 A1 Dec. 15, 2016

(51) Int. Cl.
| | |
|---|---|
| G06F 11/00 | (2006.01) |
| G06F 11/14 | (2006.01) |
| G06F 3/06 | (2006.01) |
| G06F 9/4401 | (2018.01) |
| G06F 8/61 | (2018.01) |

(52) U.S. Cl.
CPC ........ G06F 11/1417 (2013.01); G06F 3/0617 (2013.01); G06F 3/0631 (2013.01); G06F 3/0632 (2013.01); G06F 3/0644 (2013.01); G06F 3/0673 (2013.01); G06F 9/441 (2013.01); G06F 9/4406 (2013.01); G06F 8/63 (2013.01); G06F 2201/805 (2013.01); G06F 2201/85 (2013.01)

(58) Field of Classification Search
CPC ... G06F 11/1417; G06F 3/0617; G06F 3/0631
See application file for complete search history.

(56) References Cited

U.S. PATENT DOCUMENTS

| | | | | |
|---|---|---|---|---|
| 5,732,268 A | * | 3/1998 | Bizzarri | G06F 11/0748 713/2 |
| 5,918,047 A | * | 6/1999 | Leavitt | G06F 11/1417 713/2 |
| 6,862,609 B2 | | 5/2005 | Merkey | |
| 6,948,099 B1 | * | 9/2005 | Tallam | G06F 11/1417 714/3 |
| 7,065,640 B2 | * | 6/2006 | Paul | G06F 9/4416 713/1 |
| 7,409,584 B2 | * | 8/2008 | Denninghoff | G06F 9/4406 713/1 |

(Continued)

OTHER PUBLICATIONS

"Intel® Active Management Technology, Query, Restore, Upgrade, and Protect Devices Remotely," http://www.intel.com/content/www/us/en/architecture-and-technology/intel-active-management-technology.html.

(Continued)

*Primary Examiner* — Bryce P Bonzo
*Assistant Examiner* — Jonathan D Gibson
(74) *Attorney, Agent, or Firm* — Larson Newman, LLP

(57) ABSTRACT

A failure to load a primary operating system at a data processing device is identified. A partition in a volatile random access memory is allocated to store a second operating system. The second OS is stored at the partition. Information identifying the partition is stored at a first location accessible to a basic input output system executing at the data processing device.

20 Claims, 6 Drawing Sheets

(56) References Cited

U.S. PATENT DOCUMENTS

| | | | |
|---|---|---|---|
| 7,676,671 B2 * | 3/2010 | Van Rooyen | G06F 9/4401 713/1 |
| 8,132,057 B2 * | 3/2012 | Jann | G06F 11/0793 714/2 |
| 8,667,336 B2 * | 3/2014 | Aissi | G06F 11/0748 710/48 |
| 2003/0041211 A1 | 2/2003 | Merkey et al. | |
| 2004/0255106 A1 * | 12/2004 | Rothman | G06F 11/1417 713/1 |
| 2015/0149412 A1 * | 5/2015 | Kobres | G06F 9/4416 707/640 |

OTHER PUBLICATIONS

"Intel® Active Management Technology Configuration Utility User Guide," Version 8.2, Mar. 7, 2013, 117 pgs., http://www.intel.com/content/dam/www/public/us/en/documents/guides/annt-configuration-utility-user-guide.pdf.

"Windows Connect Now (WCN)," Microsoft Windows, pp. 2015, 1-3, http://windows.microsoft.com/en-us/windows7/products/features/windows-connect-now.

"Security made easy: Wi-Fi Protected Setup™; Certified Protected Setup™," Wi-Fi Security Alliance, 2014, pp. 1-4, http://www.wi-fi.org/discover-wi-fi/security.

* cited by examiner

SYSTEM AND METHOD FOR HOSTING MULTIPLE RECOVERY OPERATING SYSTEMS IN MEMORY

FIELD OF THE DISCLOSURE

This disclosure relates generally to information handling systems, and more particularly relates to hosting multiple recovery operating systems in memory.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-6 illustrate techniques for diagnosing and/or remedying boot failures at an information handling system. In particular, firmware at an information handling system is configured to monitor processes responsible for initializing execution of an OS, such as a Windows operating system, a LINUX operating system, and the like. The system OS is typically located on a storage device, such as a hard disk drive, a solid state drive, or another type of data storage device. A failure to initialize the system OS can be referred to as a boot failure. As disclosed herein, the firmware can detect a boot failure, and in response, download a service operating system that is configured to initiate diagnostic procedures to identify the cause of the boot failure. In one embodiment, firmware can allocate a partition in the system memory, store the service OS at the partition; store information at a basic input/output system (BIOS) non-volatile random access memory (NVRAM) identifying the partition and other diagnostic status; reinitialize (re-boot) the information handling system while maintaining storage of the service OS at the system memory; and boot the service OS. In another embodiment, firmware can download a repair OS; create a second partition in the system memory; store the repair OS at the second partition; update the information at the BIOS NVRAM, identifying the repair OS partition; reinitialize (re-boot) the information handling system while maintaining storage of the service OS and the repair OS at the system memory; and boot the repair OS.

Figure 1:
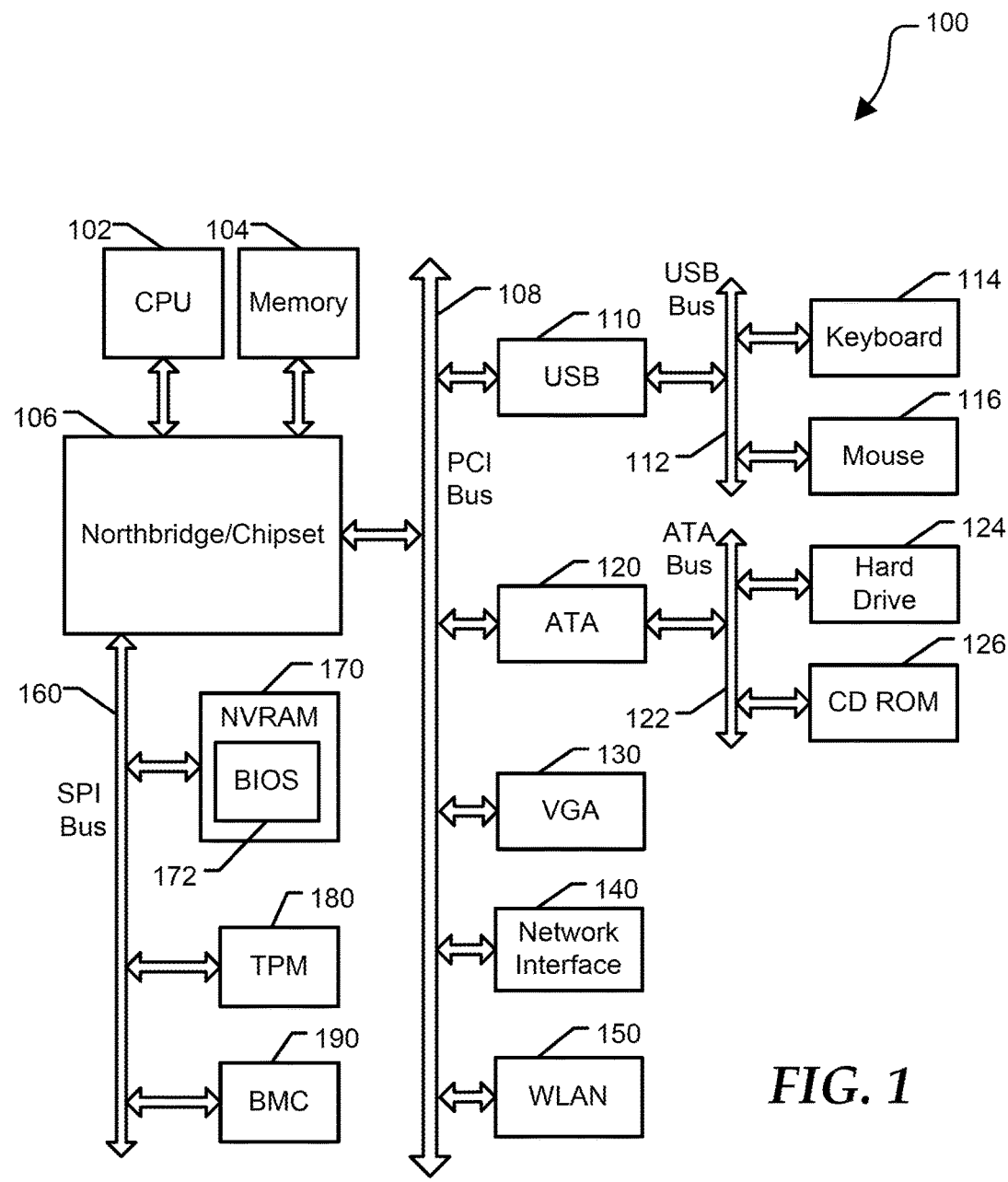
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a non-volatile random access memory (NVRAM) 170 for storing a basic input/output system (BIOS) 172, a trusted platform module (TPM) 180, and a baseboard management controller (BMC) 190. Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. Firmware 172 includes instructions executable by CPU 102 to initialize and test the hardware components of system 100, and to load a boot loader or an operating system (OS) from a mass storage device. Firmware 172 additionally provides an abstraction layer for the hardware, i.e. a consistent way for application programs and operating systems to interact with devices, such as a keyboard, a display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, firmware 172 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer (OEM) can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having firmware.

Figure 2:
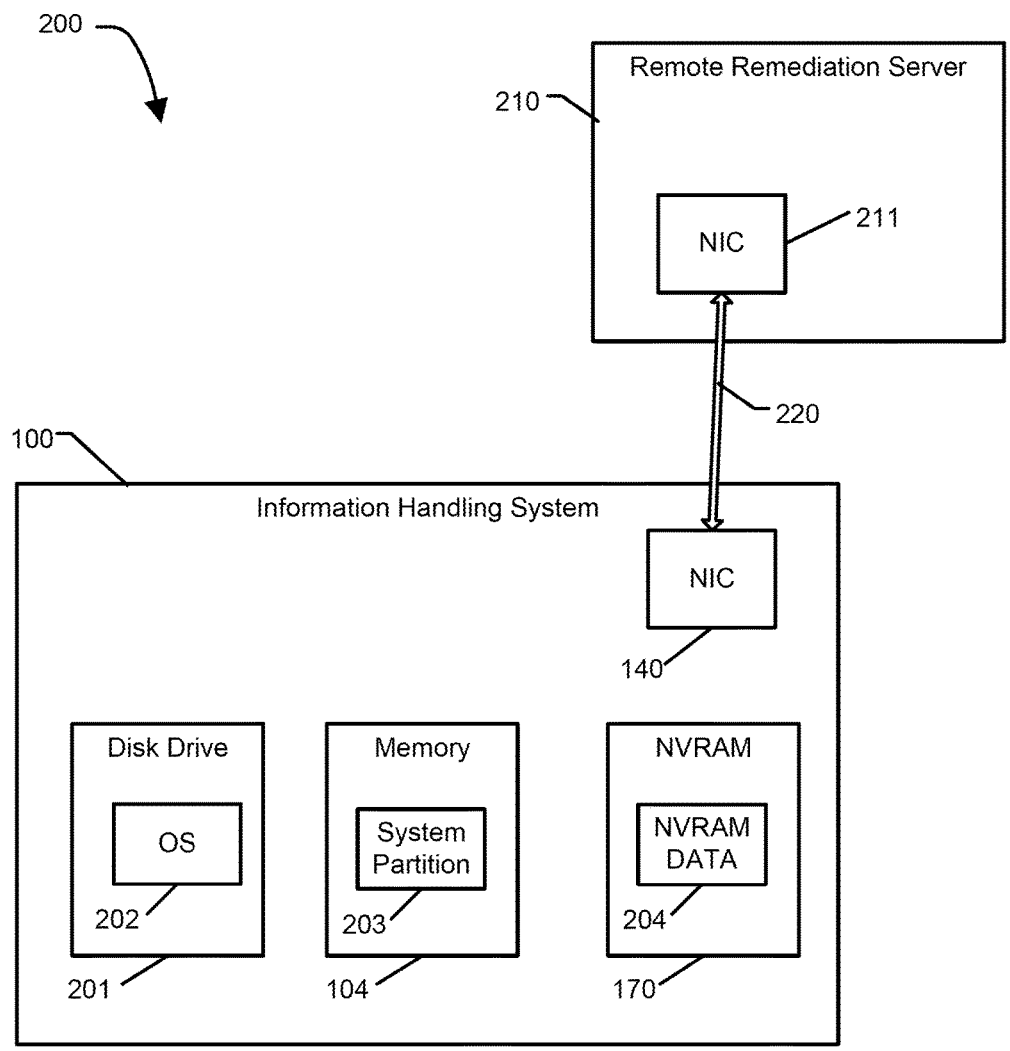
FIG. 2 is a block diagram illustrating a system for performing diagnostic testing of the information handling system of FIG. 1 according to a specific embodiment of the present disclosure.

FIG. 2 is a block diagram illustrating a system 200 for performing diagnostic testing of the information handling system of FIG. 1 according to a specific embodiment of the present disclosure. System 200 includes information handling system 100 and a remote remediation server 210. System 100 includes a disk drive 201 that is configured to store a system OS 202, system memory 104 operable to maintain a system partition 203, BIOS NVRAM 170 that includes a partition for storing NVRAM DATA 204, and NIC 140. Remediation server 210 includes a NIC 211. Information handling system 100 and remediation server 210 are configured to communicate over a network 220. In one embodiment, network 220 supports communication compliant with standard Internet protocols. In addition, network 220 can include a wired network, a wireless network, a local area network, a wide area network, a combination of such networks, and the like. For example, system 100 can communicate with remediation server 210 over a Wi-Fi network provided by WLAN 150. In one embodiment, a wireless router or modem, not shown, can receive wireless communications from WLAN 150 and propagate the communications to remediation server 210. In still another embodiment, network 220 can include a cellular telecommunications network.

During operation, firmware 172 is configured to manage initialization of system 100. Under normal circumstances, the initialization culminates with passing control to a primary OS 202, such as a Windows operating system. Primary OS 202 can be stored on disk drive 201, or another type of storage medium, such as a solid state drive, a USB memory device, or the like. For the purpose of the present example, the OS is stored on disk drive 201, which is compliant with one or more formatting, partitioning, and file system standards, such as New Technology File System (NTFS), master boot record (MBR), GUID Partition Table (GPT), and the like. Disk drive 201 typically includes an indicator identifying the presence of a bootable partition included on the drive. During an early stage of device initialization, firmware 172 can identify disk drive 201, determine that the drive contains an OS, and determine that the drive is operating properly and can be accessed.

Firmware 172 is configured to monitor and report successful or unsuccessful launching of primary OS 202. A boot failure can result from a corruption of a master boot record (MBR) or GUID partitioning table (GPT), misconfiguration of an extensible firmware interface (EFI) boot partition, corrupt Windows registry keys and values, malicious software, and the like. In one embodiment, one or more additional flags can be utilized to maintain a strike count, indicating a number of successive boot failures. For example, if a first boot operation failed due to a transient error, a subsequent attempt to boot OS 202 may be successful. Firmware 172 can include some diagnostic capabilities, but these capabilities may be limited, for example, by storage constraints of NVRAM 170. It is not atypical that a boot failure at a personal computer results in display of an error message informing a user of a problem. In many cases, a user of system 100 will have little or no training to identify or correct the problem. Typically, the extent of a user's capability may include inserting an OS installation CD ROM, if available, and attempting to perform a repair operation provided by the OS installer.

System 100 may include resident diagnostic routines. For example, system 100 may include an alternate OS, such as a service OS, which may be stored at disk drive 201 or at another data storage device. More often, remediation involves a service call, such as to the original equipment manufacturer (OEM) that supplied system 100, which can be inconvenient and costly. Due to the cost of storing and maintaining appropriate diagnostic tools at system 100, such software is often downloaded from a remote location when needed. As disclosed herein, firmware 172 is configured to establish communication with remediation server 210 over network 220. In one embodiment, firmware 172 can download a service OS, a repair OS, or other diagnostic and test software from remediation server 210. As described below, the service OS can be stored at system memory 104, where it can remain resident, withstanding one or more boot operations of system 100. System memory is typically dynamic random access memory (DRAM), such as DDR3, DDR4, and the like. DRAM memory is a volatile memory, meaning that information stored at the memory is lost if power is removed from the memory. As used herein, a boot operation refers to a substantially complete initialization of system 100, beginning at power-on self-test, proceeding through driver initialization, and culminating with installation of an operating system. A boot operation typically erases the contents of system memory 104, however as disclosed herein, the contents of system partition 203 can be maintained during, and subsequent to, a boot operation.

NVRAM data 204 is a portion of NVRAM 170 that is allocated to store system information, typically under the control of firmware 172 or other system software provided by the OEM. For example, firmware 172 can store and retrieve information during a boot operation that pertains to system status and configuration, diagnostics, and the like. Runtime processes provided by the OEM can also access NVRAM data 204 after control of system 100 has been handed over to an operating system. Access to NVRAM 170 and NVRAM data 204 is typically provided using system management mode, in response to a system management interrupt (SMI). As disclosed herein, NVRAM data 204 can be used to store information identifying one or more operating systems stored at system memory 104 and diagnostic and status information associated with a diagnostic procedure underway at system 100. For example, the information stored at NVRAM data 204 can identify an initial memory address at system memory 104 where a service OS is located. The information may also include a log identifying system errors, a record of diagnostic testing and test results, and the like. After diagnostic procedures have completed, memory space corresponding to system partition 203 can be made available to the primary operating system.

Figure 3:
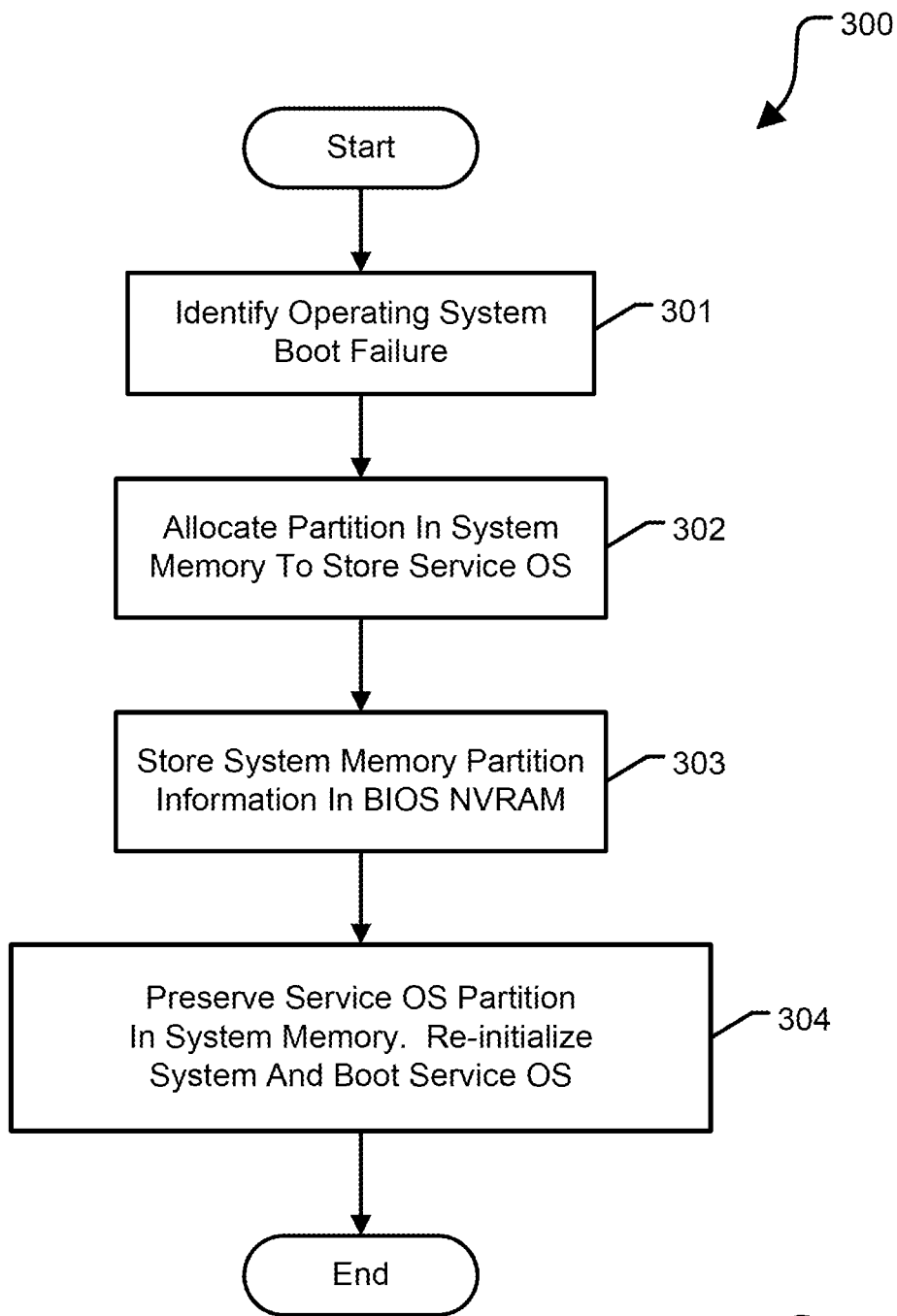
FIG. 3 is a flow diagram illustrating a method for maintaining a service operating system (OS) in system memory during a boot operation according to a specific embodiment of the present disclosure.

FIG. 3 is a flow diagram illustrating a method 300 for maintaining a service OS in system memory during a boot operation according to a specific embodiment of the present disclosure. Method 300 begins at block 301 where a failure to boot a primary operating system is identified. For example, firmware 172 can monitor attempts to load an operating system, and determine that one or more remediation procedures should be employed to diagnose and correct the boot problem. The method continues at block 302 where a partition at the system memory is allocated for storing a service OS. For example, firmware 172 can configure a memory controller to reserve a portion of system memory 104, the partition accessible to firmware 172 but inaccessible for use by a processes executing under an operating system. In one embodiment, firmware 172 can retrieve the service OS from a resource external to system 100, such as from remediation server 210. Firmware 172 can store the service OS at the allocated partition at system partition 203.

The method proceeds to block 303 where information identifying the system memory partition is stored at BIOS NVRAM. For example, firmware 172 can store information at NVRAM data 204, the information identifying a range of memory addresses corresponding to system partition 203 at system memory 104 where the service OS is stored. Furthermore, firmware 172 can store status information, such as diagnostic information identifying the initial boot failure, results of any diagnostic tests that have been completed, and information identifying what actions should be performed following a subsequent boot operation. In another embodiment, NVRAM data 204 can be stored at a non-volatile memory other than the primary BIOS NVRAM 170.

The method continues at block 304 where the service OS stored at the system memory is preserved during a re-boot operation, and the service OS is booted. For example, UEFI firmware can sequence through multiple phases, including pre-initialization (PEI), driver execution environment (DXE), and the like. The method completes with the service OS, resident at system memory 104, in control of system 100. In an embodiment, firmware 172 is responsible for keeping OS 202 resident in volatile memory during each reboot operation. For example, firmware 172 can utilize virtualization to maintain allocation of system resources, such as memory 104. For another example, the portions of memory 104 corresponding to system partition 203 can be preserved by a hardware memory controller or other hardware features.

Once the reboot operation has completed, the service OS can proceed to run diagnostics to attempt to identify the source of the initial boot problem. In an embodiment, the service OS can download additional test and diagnostic programs from remediation server 210 or from another location. These diagnostic programs can be stored and executed at system partition 203, and can be preserved, along with the service OS, during a re-boot operation. Once selected diagnostic tests have completed, system 100 can once again attempt to boot the primary OS. At all times, firmware 172 can identify the status of all diagnostic procedures, and determine which OS should be booted, by interrogating information stored at NVRAM data 204.

Figure 4:
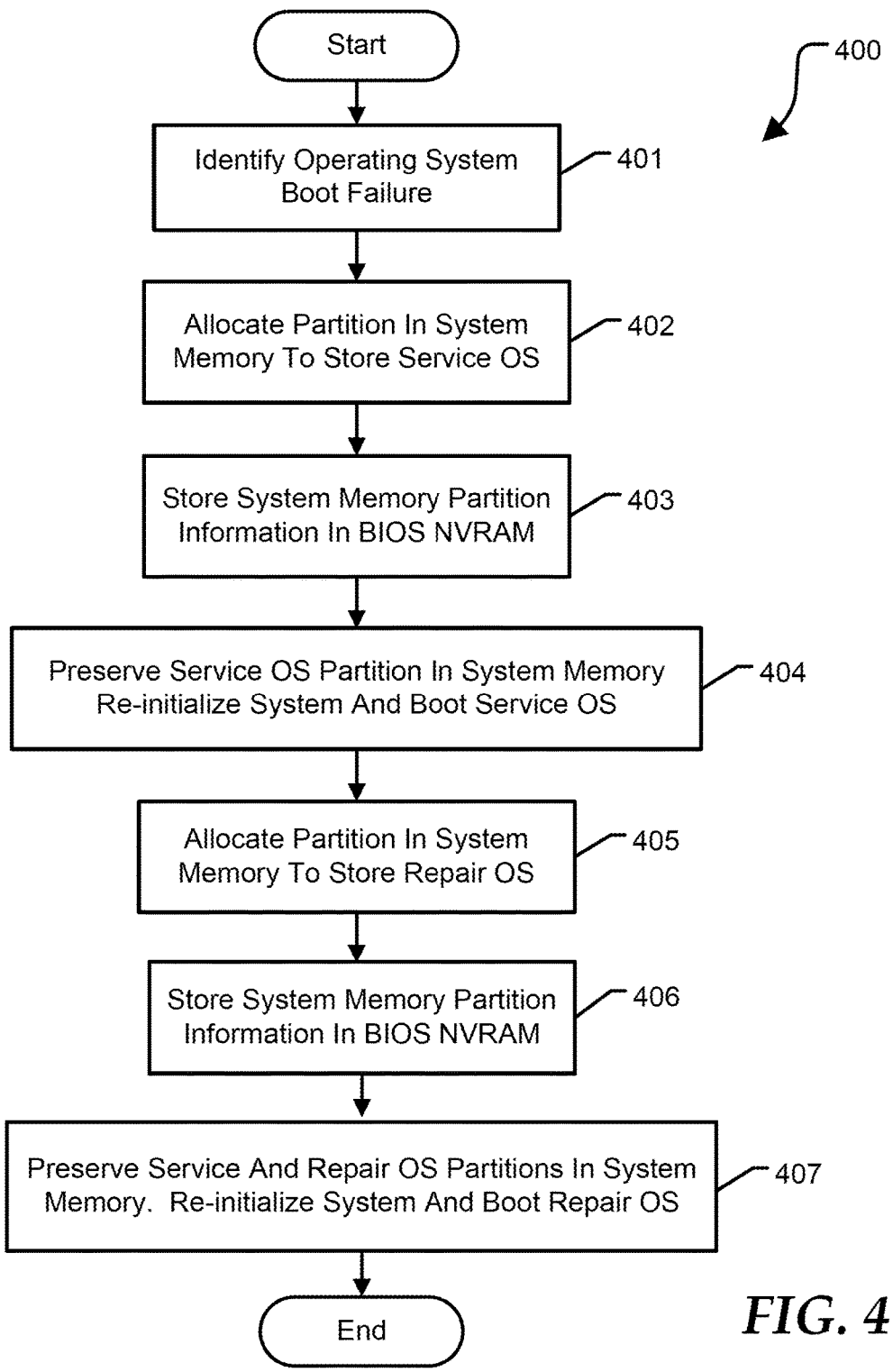
FIG. 4 is a flow diagram illustrating a method for maintaining a service OS and a repair OS in system memory during a boot operation according to a specific embodiment of the present disclosure.

FIG. 4 is a flow diagram illustrating a method 400 for maintaining a service OS and a repair OS in system memory during a boot operation according to a specific embodiment of the present disclosure. Method 400, and block 401-404 in particular, is initially the same as method 300, however the method continues at block 405 where a partition at the system memory is allocated for storing a repair OS. For example, the partition allocated to store the service OS at blocks 302 and 402 is maintained, and a new partition is allocated at system partition 203 to store the repair OS. Alternatively, the repair OS can be stored at the service OS partition, using memory address pointers to identify the regions of system partition 203 corresponding to the service OS and to the repair OS. As used herein, a repair OS is configured to provide additional diagnostic capabilities beyond those available in the service OS. One example of a repair OS is the Windows Recovery Environment (WinRE) provided by the Microsoft Corporation, however another commercial or proprietary repair OS can be utilized.

Method 400 continues at block 406 where information identifying the system memory partition is stored at the BIOS NVRAM 170. For example, firmware 172 can store information at NVRAM data 204 identifying a range of memory addresses corresponding to system partition 203 at system memory 104 where the repair OS is stored. As described above, firmware 172 can store status information and results of any diagnostic tests that have been completed thus far, and information identifying what actions should be performed following a subsequent boot operation. The method continues to block 407 where the repair OS stored at the system memory is preserved during a re-boot operation and the repair OS is booted. Following execution of diagnostic procedures performed under direction of the repair OS, firmware 172 can attempt to boot the primary OS.

Alternatively, firmware 172 can once again boot the service OS, as defined by status and schedule information stored at NVRAM data 204.

Figure 5:
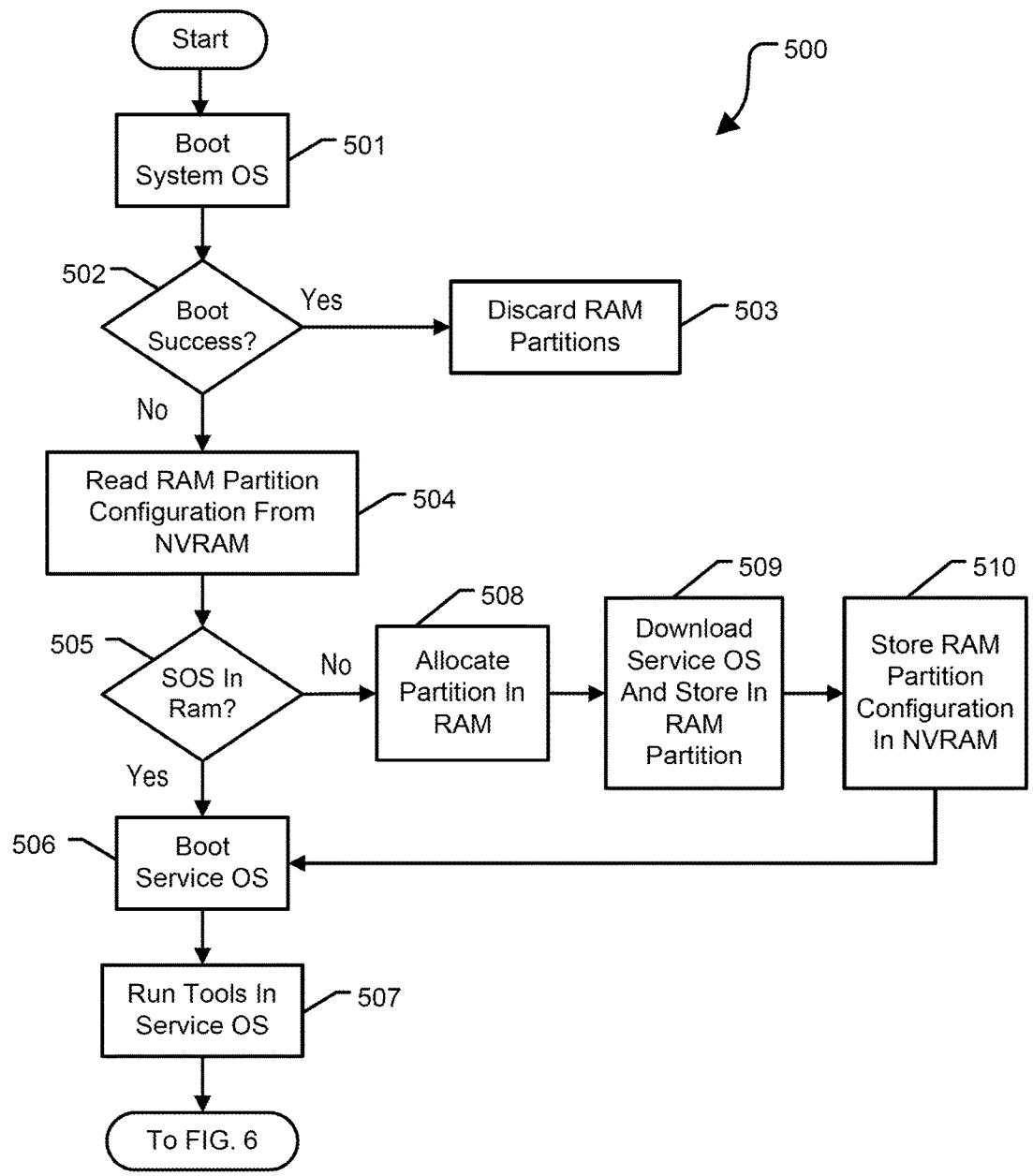
FIG. 5 is a flow diagram illustrating a method for performing system diagnostics at an information handling system according to a specific embodiment of the present disclosure.

FIG. 5 is a flow diagram illustrating a method 500 for performing system diagnostics at an information handling system according to a specific embodiment of the present disclosure. Method 500 begins at block 501 where an information handling system attempts to boot a primary operating system. For example, information handling system 100 may operate under one or more operating systems, such as Windows, Linux, and the like. The method continues at decision block 502 where it is determined whether the boot of the primary OS was successful. If the primary OS booted successfully, the method completes at block 503, where memory space allocated to diagnostic operating systems, if any, can be recovered for use by the primary OS. For example, method blocks 501-503 may represent the successful boot of the primary OS following remediation procedures, such as described above with reference to FIGS. 3 and 4. Returning to decision block 502, if primary OS fails to boot, the method proceeds to block 504.

At block 504, firmware can retrieve information stored at NVRAM data 204 that identifies the presence and configuration of diagnostic operating systems presently stored at system memory. For example, at blocks 403 and 406, information identifying partitions allocated at system memory 104 for storing one or both of a service OS and a repair OS was stored at NVRAM data 204. During each boot operation at system 100, firmware can access this information to determine which operating system should be loaded. If the stored information indicates that a service OS is presently available at system partition 203, the method proceeds from decision block 505 to block 506 where the service OS can be booted. The method proceeds to block 507 where diagnostic tools provided by the service OS can be executed. Returning to decision block 505, if the service OS has not yet been stored at system partition 203, the method proceeds to block 508 where a partition for storing the service OS can be allocated at system memory 104. The method continues at block 509 where the service OS can be downloaded and stored at system memory 104. The method continues at block 510 where system partition information can be stored at NVRAM data 204. The method proceeds to block 508 where the service OS can be booted, as described above.

Figure 6:
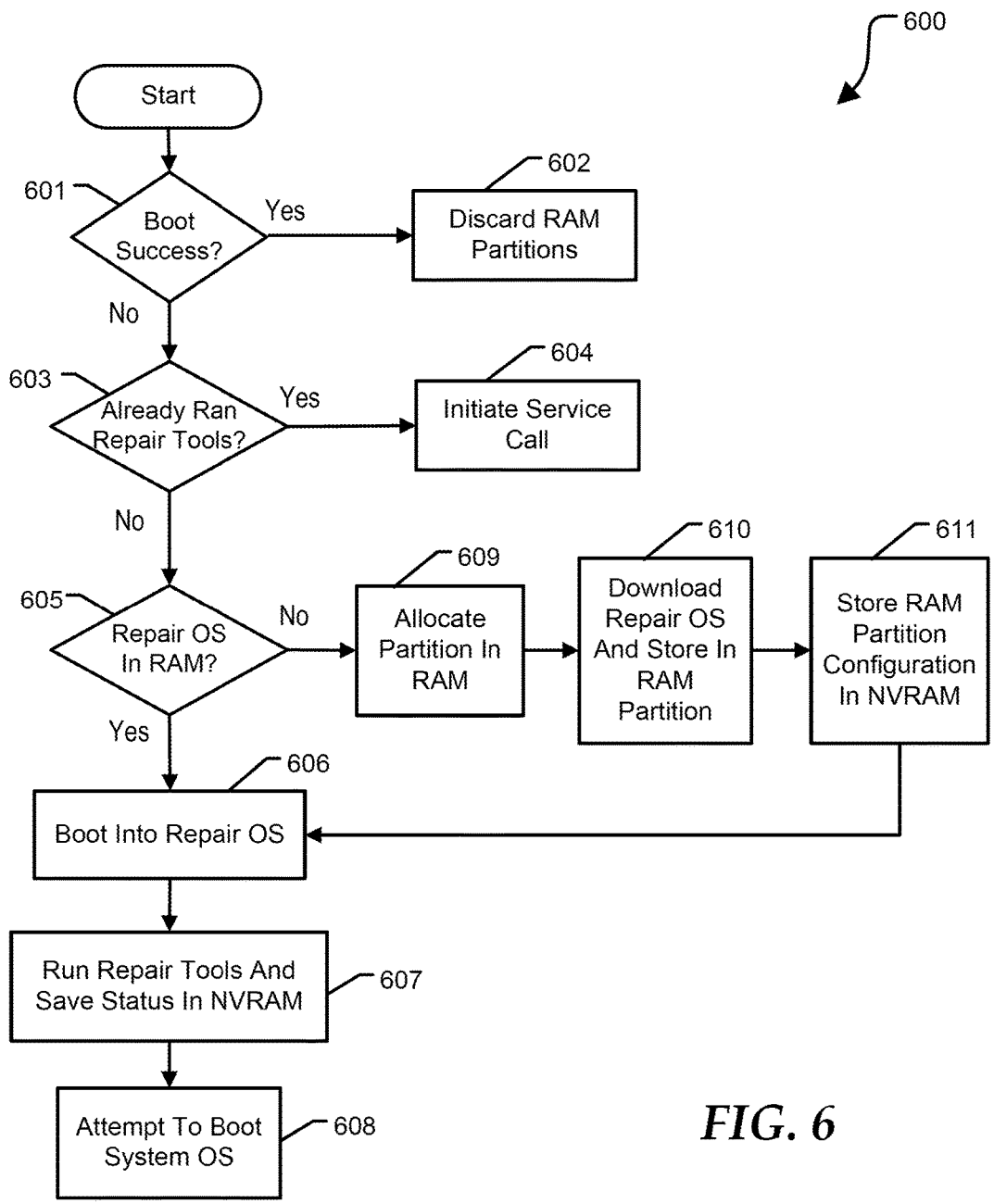
FIG. 6 is a flow diagram illustrating a method for performing system diagnostics at an information handling system according to another embodiment of the present disclosure.

FIG. 6 is a flow diagram illustrating a method 600 for performing system diagnostics at an information handling system according to further embodiments of the present disclosure. In one aspect method 600 can commence when method 500 has completed. In particular, method 600 illustrates execution of further diagnostic procedures provided by a repair OS following services performed by the service OS. Method 600 begins at block 601 where it is determined whether a boot of the primary OS was successful. If the primary OS booted successfully, such as due to remedial actions performed by the service OS, the method completes at block 602 where memory space allocated to diagnostic operating systems, if any, can be recovered for used by the primary OS. For example, system partition 203 can may include partitions allocated for storing a system OS, a repair OS, both a system and repair OS, another operating system, or other system software. Once the primary OS is successfully booted, these operating systems and tools may no longer be needed. If the primary OS failed to boot successfully, the method proceeds from decision block 601 to decision block 603 where firmware 172 can access information stored at NVRAM data 204 to determine whether repair tools proved by a repair OS have already been run. If diagnostic procedures provided by both a service OS and a repair OS have already been executed and system 100 still fails to load the primary OS, the method completes at block 604 where a service call to the OEM is initiated, or a user of system 100 can utilize other services to remedy the situation.

Returning to decision block 603, if repair tools provided by the repair OS have not been run previously, the method proceeds to decision block 605, where it is determined whether a repair OS is currently stored at system memory 104. If the repair OS is presently resident in system partition 203, the method continues at block 606 where system 100 is re-initialized and the repair OS is booted. As described above, information stored at system partition 203 of memory 104 is not deleted during the re-boot operation. The method continues at block 607 where repair tools provided by the repair OS are executed, and status information can be stored at NVRAM data 204. The method completes at block 608 where firmware 172 can attempt to boot the primary OS. Returning to decision block 605, if the repair OS has not yet been loaded into system memory 104, the method proceeds to block 609 where a partition at system memory 104 is allocated. At block 610, the repair OS is downloaded from remediation server 210 and stored at system partition 203. The method continues at block 611 where NVRAM data 204 can be updated to indicate that the repair OS is stored at system memory 104. The method proceeds to block 608 where the repair OS can be booted, as described above.

By storing one or more diagnostic operating systems or other diagnostic tools at memory 104, and maintaining that storage through system re-initialization, time required for analysis and remediation can be minimized. If, during the debug operation, there is a need to revisit either the service OS or repair OS, the transition can be performed quickly because there is no need to repeatedly download the operating systems.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   executing a basic input output system (BIOS), the BIOS initially stored at a non-volatile random access memory (NVRAM), the BIOS to initialize components of a data processing device and to load a primary operating system (OS), the primary OS stored at a storage device other than the NVRAM;
   identifying a failure to load the primary OS at the data processing device;
   allocating a partition in a volatile random access memory to store a second OS;
   storing the second OS at the partition; and
   storing information identifying the partition at a first location accessible to a basic input output system (BIOS) executing at the data processing device.

2. The method of claim 1, wherein the first location is in the NVRAM.

3. The method of claim 1, wherein the first location is in the volatile random access memory.

4. The method of claim 1, further comprising:
   preserving storage of the second OS at the volatile memory during a re-boot operation;
   booting the second OS;
   executing first diagnostic tools available to the second OS; and
   storing diagnostic information at the first location.

5. The method of claim 1, further comprising:
   accessing the information from the first location during a hardware initialization re-boot operation; and
   determining which OS to load based on the accessed information.

6. The method of claim 1, further comprising:
   allocating a second partition in volatile memory to store a third OS;
   storing the third OS in the second partition; and
   storing information identifying the second partition at the first location.

7. The method of claim 6, further comprising:
   preserving storage of the second OS and the third OS at the volatile memory during a re-boot operation;
   booting the third OS;
   executing second diagnostic tools available to the third OS; and
   storing diagnostic information at the first location.

8. The method of claim 1, further comprising:
   retrieving the second OS over a network from a remote system.

9. The method of claim 1, further comprising:
   in response to booting the primary OS successfully,
   updating the stored information to include further diagnostic results; and returning space at the volatile memory allocated to the second OS partition for use by the primary OS.

10. A system comprising:
a processor;
a volatile memory coupled to the processor; and
a non-volatile random access memory (NVRAM) coupled to the processor, the NVRAM storing firmware instruction executable by the processor to initialize components of the system and to load a primary operating system (OS), the primary OS stored at a storage device other than the NVRAM, the firmware instructions further to:
identify a failure to load the primary OS at the system;
allocate a partition in the volatile random access memory to store a second OS;
store the second OS at the partition; and
store information identifying the partition at a first location accessible to a basic input output system executing at the system.

11. The system of claim 10, wherein the first location is in the NVRAM.

12. The system of claim 10, wherein the first location is in the volatile memory.

13. The system of claim 10, wherein the processor is further to:
preserve storage of the second OS at the volatile memory during a first hardware initialization re-boot operation;
boot the second OS;
execute first diagnostic tools available to the second OS; and
store diagnostic information at the first location.

14. The system of claim 10, wherein the processor is further to:
access the information from the first location during a hardware initialization re-boot operation; and
determine which OS to load based on the accessed information.

15. The system of claim 10, wherein the processor is further to:
allocate a second partition in volatile memory to store a third OS;
store the third OS in the second partition; and
store information identifying the second partition at the first location.

16. The system of claim 15, wherein the processor is further to:
preserve storage of the second OS and the third OS at the volatile memory during a re-boot operation;
boot the third OS;
execute second diagnostic tools available to the third OS; and
store diagnostic information at the first location.

17. The system of claim 10, wherein the processor is further to retrieve the second OS over a network from a remote system.

18. The system of claim 10, wherein in response to booting the primary OS successfully, the processor is further to:
update the stored information to include diagnostic results; and
return space at the volatile memory allocated to the second OS partition for use by the primary OS.

19. A non-volatile random access memory (NVRAM) storing instructions executable by a processor to:
initialize components of a data processing device and to load a primary operating system (OS), the primary OS stored at a storage device other than the NVRAM;
identify a failure to load the primary OS at the data processing device;
allocate a partition in a volatile random access memory to store a second OS;
store the second OS in the partition; and
store information identifying the partition at a first location accessible to a basic input output system executing at the data processing device.

20. The computer-readable medium of claim 19, further comprising instructions executable by the processor to:
preserve storage of the second OS at the volatile memory during a re-boot operation;
boot the second OS;
execute first diagnostic tools available to the second OS; and
store diagnostic information at the first location.

* * * * *